(No Model.) 2 Sheets—Sheet 1.
G. H. PALMER.
FISHING REEL.
No. 281,918. Patented July 24, 1883.
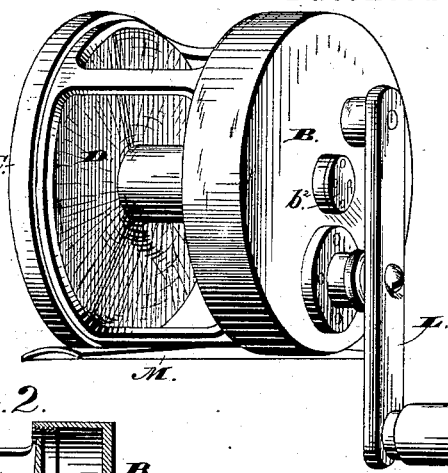
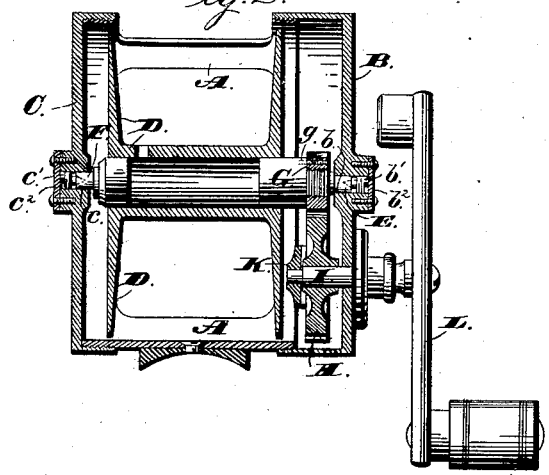
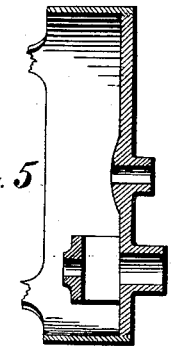
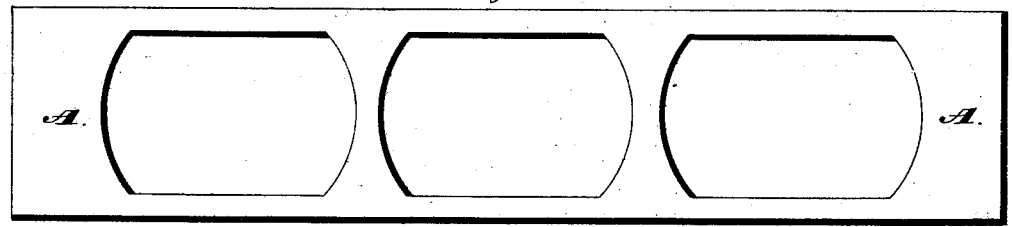
Witnesses:
Jas. E. Hutchinson
Philip G. Russell
Inventor.
George H. Palmer
by Pindle and Russell
Attorneys (No Model.) 2 Sheets—Sheet 2.

G. H. PALMER.
FISHING REEL.

No. 281,918. Patented July 24, 1883.

Witnesses:
Jas. E. Hutchinson.
Philip G. Russell.

Inventor.
George H. Palmer
by Prindle and Russell
Attorneys

UNITED STATES PATENT OFFICE.

GEORGE H. PALMER, OF FAIR HAVEN, MASSACHUSETTS, ASSIGNOR TO
THOMAS M. BISSETT AND THOMAS J. CONROY, OF NEW YORK, N. Y.

FISHING-REEL.

SPECIFICATION forming part of Letters Patent No. 281,918, dated July 24, 1883.

Application filed November 3, 1882. (No model.)

*To all whom it may concern:*

Be it known that I, GEORGE H. PALMER, of Fair Haven, in the county of Bristol and State of Massachusetts, have invented certain new and useful Improvements in Fishing and other Reels; and I do hereby declare that the following is a full, clear, and exact description thereof, reference being had to the accompanying drawings, making a part of this specification, in which—

Figure 4:
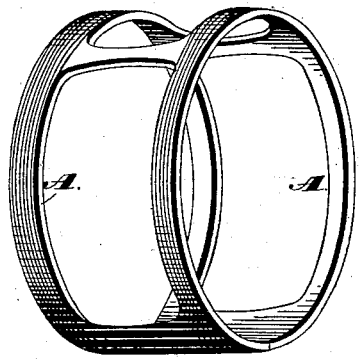
Figure 6:
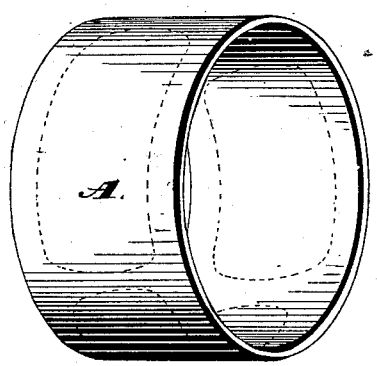

Figure 1 shows a perspective view of my improved reel. Fig. 2 shows a longitudinal vertical central section of the frame, spool, and multiplying-gear. Fig. 3 shows as unrolled the strip of metal which forms the cylindrical drum. Fig. 4 shows the same as rolled up, with its ends joined to form the drum, and provided with the screw-threads for attachment of the end plates. Fig. 5 shows another form of the end plate upon the crank end of the reel. Fig. 6 is a view showing details of the manner of construction.

Letters of like name and kind refer to like parts in each of the figures.

The object of my invention is to provide a reel which shall be cheap, compact, and not liable to get out of order.

To that end it consists in the construction and arrangement of parts, as hereinafter described, and more specifically pointed out in the claims.

In the drawings, A designates the drum forming the frame of the reel, and serving to connect the two end plates rigidly together. This drum is formed of a strip of metal which has portions cut away, as shown in Fig. 3. These portions can be punched or cut out in any way desired. When this strip has been rolled up and the ends properly united, screw-threads are cut upon the outside of the resulting cylinder at the ends thereof, as shown in Fig. 4.

The cup-shaped end caps, B and C, are provided with internal screw-threads to fit the external ones on the ends of the drum. At their centers they are provided with outwardly-extending hub-like portions, through which and through the plates pass the central openings, $b$ and $c$. In these openings are journaled the bearing-spindles of the spool.

Into the hubs are screwed the adjustable plugs $b'$ and $c'$, respectively, forming bearings for the ends of the spool-spindles, a conical point on each plug fitting into a corresponding recess in the spindle ends. Over the ends of the hubs, and covering the central openings, are the plates $b^2$ and $c^2$, fastened, as shown, by screws.

The spool D is cast in the desired shape, and has its center bored out from end to end, as shown, so as to be as light as possible. Into the ends of this longitudinal passage are inserted the bearing pieces or spindles E and F. These extend into the passage only a sufficient distance to allow of firm fastening therein. Their outer ends are reduced in size to fit the journal-bearing openings in the caps, as shown.

The cup-shaped cap B is made deeper than cap C, so that sufficient room shall be left between it and the spool to receive the multiplying-gearing.

Upon the bearing-piece E the pinion G is screwed, and it is locked in position thereon by a small screw, $g$, all as shown in Fig. 2. This pinion gears with the larger wheel H, fast to the shaft I, journaled at its inner end in the bridge-piece K, projecting from the cap, and at its other end journaled in and extending through the cap-plate and the hub-like projection on the external face thereof.

To the outer end of this shaft I is attached in a common and well-known way the balanced crank L.

To the lower side of the drum, as shown in Fig. 2, is screwed the usual longitudinally-grooved piece, M, which fits upon the pole, and over which the holding-rings are to be slipped.

In Fig. 5 I show the drum extended, so as to give room between the reel and the cap-plate E, which in this case is screwed inside of the end of the drum, instead of outside, as in Fig. 2. The plate can then be without any side flange, and is cheaper and more easily made.

If a simple reel without multiplying-gear were desired, the plate would then, of course, only have the single central opening, and would be screwed down close to the end of the spool, the drum being made shorter and without the end extension shown in Fig. 5. The crank would be attached directly to the end of bearing-piece E. The other cap-plate could also be screwed into the end of the drum in the same way. Such a reel is very simple and compact, and can be made very cheaply.

In the manufacture of the drum, metal tubing of the proper diameter and length can be used, as shown in Fig. 6. The external or internal screw-threads, as desired, are to be formed upon or within the ends of the short cylinders and the necessary openings cut, as indicated in dotted lines, so that the drum will be substantially the same in appearance as that shown in Fig. 4.

Instead of fastening the end caps to the drum by screwing the same on or within the ends thereof, these plates could be held in place by the well-known bayonet-fastening, or by any other means desired; but I prefer the means which I have shown and described. Either or both of the caps can be screwed into instead of over the ends of the drum.

In the construction of my reel I do away entirely with the usual pillars or bolts, with their screw-nuts, which are used to make the frame-work of reels and to connect the end plates or caps. These nuts are, as is well known, very liable to work loose and get lost. The consequent loosening of the frame and play of the parts will, as reels are ordinarily constructed with multiplying mechanism, cause the same to get out of gear and become inoperative, so that the reel is rendered useless until the parts are tightened up again.

In my reel the caps and drum have such an extended screw-bearing surface that it is obvious they cannot work loose, but will hold all the parts and gearing firmly in place, while still they can easily and quickly be separated and the reel taken apart.

Ordinarily there is at the gearing end of multiplying-reels the frame end plate proper, which is provided with the necessary bearings for the pinions, and then over this is fastened by screws a cap or covering plate. By my construction I do away with this end plate and make the cap perform the double function of such plate and a cover for the gearing.

My reel, therefore, for the above-given reasons, is cheaper, and can be made lighter, simpler, more compact, and less liable to get out of order, than the reels heretofore in the market.

Having thus fully set forth the nature of my invention, what I claim is—

1. In a fishing-reel, the drum made in one piece, with suitable openings cut therein to make an open frame, and provided at each end with screw-threaded portions, in combination with the end caps, provided with corresponding screw-threaded portions to fit those on the drum, substantially as and for the purpose set forth.

2. In a fishing-reel, the drum made in one piece, with suitable openings cut therein, and provided at each end with screw-threaded portions, in combination with the end caps provided with corresponding screw-threaded portions to fit those on the drum, and a reel-attaching device fastened directly to the side of drum, substantially as shown and described.

3. In a reel, the cup-shaped covering-cap screw-threaded to fit the threaded portion on the end of the drum, and with a bearing for the spool-spindle and a bridge and bearing to receive the crank-shaft, substantially as and for the purpose set forth.

4. In a reel, the combination of the drum, made in one piece, the end caps screwed upon the ends thereof, the spool provided with bearing-spindles journaled in said plates, the pinion on one of the spindles between the cap and end of spool, and the gear-wheel on the crank-shaft, journaled in the cap and the bridge-piece on the same, substantially as and for the purpose set forth.

5. In a fishing-reel, the spool bored out centrally and longitudinally, the short bearing-pieces inserted into the central passage at the ends thereof, the pinion screwed and locked upon one of the bearing-pieces, and the adjustable screw-plugs in the end plates bearing against the ends of the spool bearings or spindles, substantially as and for the purpose set forth.

6. In a fishing-reel, the combination of the spool, its bearings journaled in the end caps, the screw-plugs in the hubs on the caps bearing against the ends of the spool-spindles to adjust the longitudinal position of the spool, and the covering-plates on the ends of the hubs, substantially as and for the purpose set forth.

In testimony that I claim the foregoing I hereby subscribe my name this 23d day of October, A. D. 1882.

GEORGE H. PALMER.

Witnesses:
F. A. MILLIKEN,
EDWARD J. LUCE.